(12) United States Patent
Schulz et al.

(10) Patent No.: US 9,544,702 B2
(45) Date of Patent: Jan. 10, 2017

(54) DYNAMIC CHARACTERIZATION OF A COMMUNICATION DEVICE

(71) Applicants: Dieter Schulz, Dunrobin (CA); Mirjana Popovic, Ottawa (CA); Chi Keung Leung, Kanata (CA); Edward P. Gancarcik, Ottawa (CA)

(72) Inventors: Dieter Schulz, Dunrobin (CA); Mirjana Popovic, Ottawa (CA); Chi Keung Leung, Kanata (CA); Edward P. Gancarcik, Ottawa (CA)

(73) Assignee: Mitel Networks Corporation, Ottawa (CA)

( * ) Notice: Subject to any disclaimer, the term of this patent is extended or adjusted under 35 U.S.C. 154(b) by 559 days.

(21) Appl. No.: 13/948,940

(22) Filed: Jul. 23, 2013

(65) Prior Publication Data

US 2015/0030168 A1    Jan. 29, 2015

(51) Int. Cl.
*H04R 29/00* (2006.01)
*H04M 9/08* (2006.01)
*H04R 3/04* (2006.01)

(52) U.S. Cl.
CPC ............. *H04R 29/001* (2013.01); *H04R 3/04* (2013.01); *H04M 9/082* (2013.01); *H04R 2430/03* (2013.01)

(58) Field of Classification Search
CPC ..... H04R 29/001; H04M 1/035; H04M 9/085; H04M 1/6041; H04M 9/082; H04M 1/6075
USPC ......................... 381/55, 59, 96, 95, 94.9, 98, 100–104, 381/107, 108; 379/406.01–406.16; 455/63.1, 455/114.2, 570

See application file for complete search history.

(56) References Cited

U.S. PATENT DOCUMENTS

| | | | |
|---|---|---|---|
| 6,597,787 B1* | 7/2003 | Lindgren | H04B 3/21 379/406.01 |
| 2009/0225980 A1* | 9/2009 | Schmidt | H04M 9/082 379/406.02 |
| 2013/0217349 A1* | 8/2013 | Helsloot | H04M 1/035 455/114.2 |
| 2013/0287203 A1* | 10/2013 | Hodges | H04M 9/082 379/406.01 |

* cited by examiner

*Primary Examiner* — David Ton

(57) ABSTRACT

Technology for dynamic characterization of a communication device is disclosed. One method comprises sending an acoustic characterization excitation signal to be output by an acoustic transducer in the communication device. A received acoustic coupling signal that is received by a microphone of the communication device in response to the output of the acoustic transducer is measured. An acoustic signal conditioning algorithm is applied to at least one of the microphone or the acoustic transducer to reduce an amplitude of the acoustic signal or the received acoustic coupling signal to a level below a selected threshold.

17 Claims, 9 Drawing Sheets

DYNAMIC CHARACTERIZATION OF A COMMUNICATION DEVICE

BACKGROUND

Constructing audio communication devices that have consistent acoustic performance can be difficult. The various transducers involved in sound reproduction, such as microphones, earpieces, and loudspeakers are designed based on set specifications and tolerances. However, regardless of how thoroughly a transducer is evaluated during a product's design phase, manufacturing drift in a transducer' design can cause high failure rates during product testing, thereby increasing overall product costs. In addition, even those transducers that pass the product testing phase can have a relatively wide range of outputs.

Accordingly, modern communication devices such as desktop phones are typically designed around a transducer that is operating within a pre-defined set of limits and tolerances. Adjustments are not made during manufacturing to compensate for instances where transducers that may stray from their expected performance limits. Large groups of communication devices that are manufactured together are designed to operate based on a worse case performance of transducers operating on the edge of the pre-defined limits. This type of design results in non-optimal performance, even for communication devices with transducers having near optimal performance.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1A:
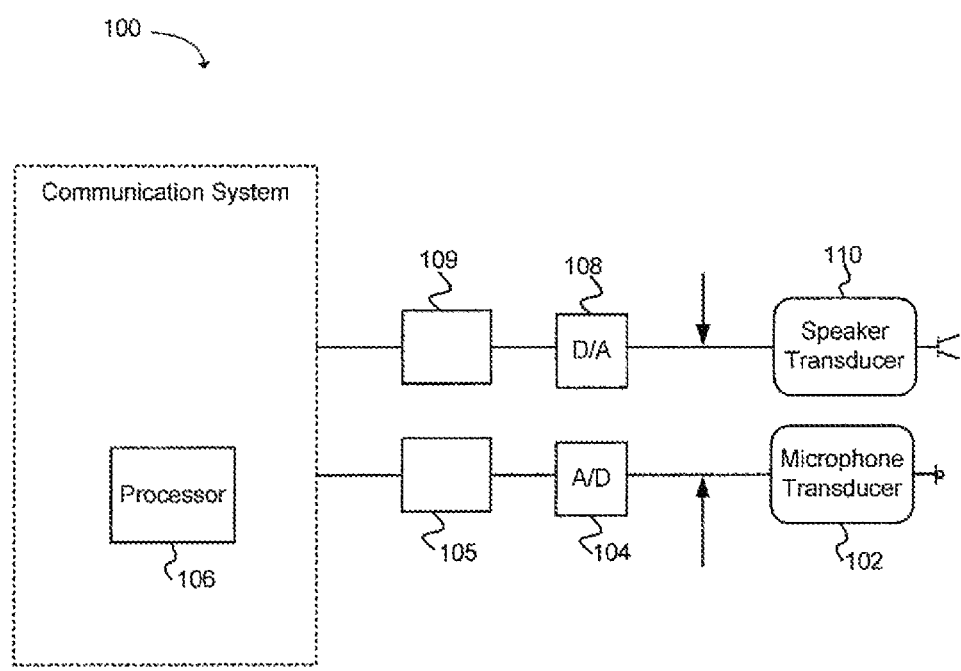
FIG. 1a illustrates a block diagram of an example communication device.

Reference will now be made to the exemplary embodiments illustrated, and specific language will be used herein to describe the same. It will nevertheless be understood that no limitation of the scope of the invention is thereby intended.

DETAILED DESCRIPTION

Definitions

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Additional definitions may be provided in the example embodiments.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Typical desktop telephony devices, such as those used in offices and conference rooms, are often designed around transducers used in the telephony devices. The transducers are configured to operate within a predefined set of limits and tolerances. Adjustments may not be able to be made to the transducers in each telephony device during manufacture to compensate for instances where the transducers stray from their expected performance limits.

When transducers operate outside of desired limits, it can result in a distortion and increased coupling that occurs between transducers within the telephony device. For example, an increased coupling signal between one or more speaker transducers and one or more microphone transducers that operate in a telephony device may result when one or more of the speaker or microphone transducers are out of tolerance. The increased coupling signal can result in distortion, echo, and other forms of feedback for users of the telephony device and/or the people with which they are communicating. In addition, the increased coupling signal can also overwhelm other components in the system, such as echo cancellers or echo suppressors, so that they would add or leak through an echo instead of cancelling it.

To compensate for the range of tolerances in transducers in a telephony device, a static equalization filter can be used to reduce the coupling signal returned by a handset of a telephony device. The static equalization filter is typically designed by characterizing a sample of telephony devices during the manufacturing process. For instance, a sample of 30 phones may be used. The filter is often biased to deal with a worst case scenario in the sample to allow for sufficient engineering margin of the tolerances of the transducers.

By designing the static filter to the worst case scenario, the telephony devices with transducers having greater performance are not able to function up to the capabilities of their transducers. This results in the best telephony devices being designed to underperform. A select number of telephony devices outside of the sample group may have transducers which have characteristics below the worst case scenario of the sample group. These telephony devices may not function as desired. In addition, the characteristics of the transducers can change over time, resulting in telephony devices with degraded functionality over time. This can be expensive to the end user, who may replace relatively expensive communications equipment that is not functioning as desired due to components changing outside of the tolerances for which the static equalization filter was designed.

To reduce these limitations, a dynamic characterization of a communication device is disclosed. The term dynamic characterization, as used herein, refers to the characterization and adjustment of inputs to and/or outputs from components in the communication device after the communication device has been manufactured. The characterization and adjustment may occur based on user input. For instance, a user may command the communication device to perform a characterization and adjustment. Alternatively, the characterization and adjustment can occur automatically when the communication device operates outside of a desired operational tolerance. The components can include, but are not limited to, an input transducer such as a microphone and an acoustic transducer such as a speaker. Communication device, as used herein, refers to a device used for full duplex communication. A communication device can include a desktop telephone, a speaker phone, a handheld telephony device, a computing device such as a smart phone, a tablet, a laptop, a desktop, or other type of specialized computing device capable of full duplex communication.

The ability to perform a dynamic characterization and adjustment of a communication device can overcome many of the limitations that were previously discussed. For example, a dynamic characterization is performed on a single device, so only the components within the communication device are taken into account. This allows a device with better than average components, such as input transducers (i.e. microphones) and/or output transducers (i.e. speakers) to be characterized and adjusted to provide better performance relative to a communication device that is characterized using a static filter designed during the manufacturing process. As previously discussed, the static filter is typically designed for a worst case scenario, thereby reducing the capability of devices with components operating above the worst case scenario.

In addition, communication devices with components such as transducers that are operating outside of (i.e. worse than) limitations of typical transducers in a test batch can also be characterized and adjusted using the dynamic characterization process. Even though one or more components may be operating outside of desired limitations, the dynamic characterization process can be sufficiently flexible to reduce undesired characteristics, such as distortion and coupling between a speaker and a microphone in the communication device.

Thus, the use of dynamic characterization can provide improvements to communication devices having components such as transducers that operate above or below standard threshold values of typical components. Thus, components with wider tolerances, and potentially lower cost, can be used in manufacturing. This can result in higher yields and lower production costs.

Additionally, improved audio performance can be obtained due to more optimized characterization and equalization adjustments. The improved audio performance can enhance the user experience with the communication device and reduce customer complaints, thereby lowering support costs.

Dynamic characterization can also be used to extend the useful life of communication devices. As previously discussed, as transducers age, their characteristics can change. This change in characteristics can result in undesired levels of acoustic coupling. With a static filter, the changes in transducer performance as a product ages typically results in a user replacing the communication device.

However, with dynamic characterization, filtering can be dynamically adjusted to compensate for changes in the performance of components such as transducers. For example, a transducer such as a microphone may become more or less sensitive at a specific frequency band. A dynamic filter can be adjusted to compensate for the change in sensitivity at the specific frequency band. Similar adjustments can be made to compensate for changes in a speaker transducer. This enables the life of the communication device to be extended, thereby significantly reducing the costs in replacing potentially expensive infrastructure components such as communication devices.

In accordance with one embodiment of the present invention, a communication device can be configured to perform a dynamic characterization of the performance of one or more transducers operating in the communication device. The performance of the transducer can then be adjusted to compensate for any performance outside of threshold boundaries. The adjustment can be performed using dynamic filtering. This will be discussed more fully below.

FIG. 1a provides an example block diagram of a generic communication device 100, such as a telephony device, that includes at least two transducers: a microphone transducer 102 and a speaker transducer 110. The microphone and speaker transducers may operate in a telephony handset designed to be placed next to a user's ear and mouth, respectively. Alternatively, the microphone and speaker transducers may be configured to operate in a hands-free operation, such as a speakerphone. While only a single microphone and speaker transducer are shown, this is not intended to be limiting. The communication device can include a plurality of microphone and speaker transducers.

In the example embodiment illustrated in FIG. 1a, the microphone transducer 102 is configured to detect acoustic energy and convert it to an analog signal. The analog signal can then be converted to a digital signal with an analog to digital converter (A/D) 104. The digital signal can then be manipulated as desired using a processor 106. The processor may be a digital signal processor (DSP), a generic microprocessor, a field programmable gate array (FPGA), an application specific integrated circuit (ASIC), or the like. The digital signal can be communicated on a wired or wireless signal via a telecommunications network to a desired location.

The audio signal can be received at the communication device via the telecommunications network, manipulated by the processor 106, and output to a digital to analog converter (D/A) 108. The D/A converter can convert the digital signal output by the processor to an analog signal, which is then sent to the speaker transducer. While a single processor is illustrated in FIG. 1a, multiple processors may be used to manipulate the signals to and from the speaker transducer 110 and microphone transducer 102, respectively.

The communication device 100 can be a full duplex device that allows audio from the speaker transducer 110 to be produced and acoustic energy to be communicated from a user or other source to the microphone transducer 102 simultaneously. When excessive coupling of the speaker transducer's output is picked up by the microphone transducer, the coupled energy can result in echoing, distortion, and a potential for a runaway feedback loop that can cause the speaker to output a high pitched sound at near maximum amplitude. When the communication device operates in full duplex mode, processor 106 can be configured to reduce echoing that may be caused by feedback from the speaker transducer to the microphone transducer 102 in such a way a that a far end user on a communication network cannot hear the echo. When excessive coupling into microphone transducer 102 occurs, it may be more than the processor 106 is configured to reduce, thereby resulting in echoing and other abnormalities in the signal, the echo adequately.

As previously discussed, static filters 105, 109 are often installed in the manufacturing process of a communication device to reduce a coupling signal between the speaker transducer 110 and the microphone transducer 102 to be below a desired threshold value.

Figure 1B:
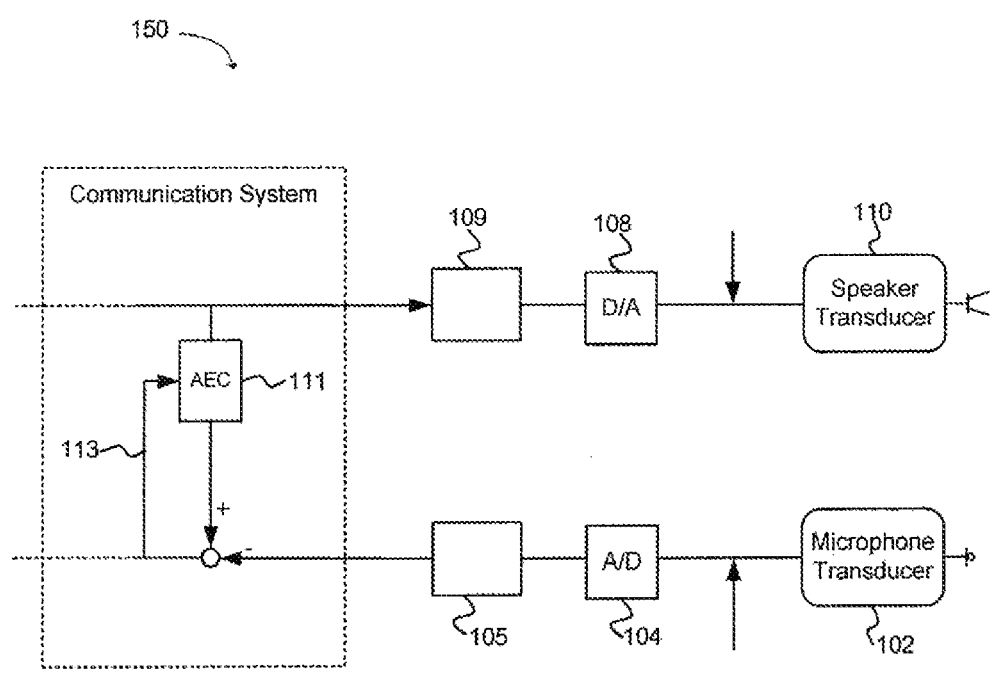
FIG. 1b illustrates a block diagram of an example communication device using an acoustic echo canceller.

FIG. 1b illustrates an additional example of a communication device 150 that includes an Acoustic Echo Canceller (AEC) 111. The AEC may be incorporated in the processor 106 or another processor in the communication system. The AEC uses feedback path 113 to reduce the amount of echo caused by feedback.

Figure 2:
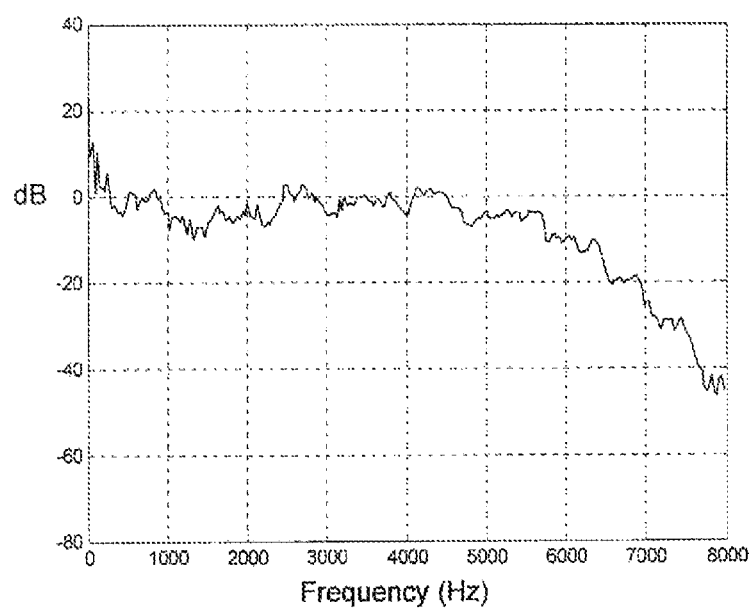
FIG. 2 illustrates an acoustic coupling signal plotted for a communication device in accordance with an embodiment of the present invention.

FIG. 2 illustrates an example of an acoustic coupling test performed on a communication device, such as a desktop office phone. It can be desired that the coupling value be less than 0 decibels (dB) for the audible frequency range communicated by the device. In this example, the range between approximately 0 Hertz (Hz) and 8000 Hz is illustrated. The coupling value between a microphone and a speaker on a telephony device is illustrated. In this example, the echo return loss (ERL) is measured and plotted. As can be seen, coupling values of the ERL that are greater than 0 dB are shown for the frequency ranges between 0 Hz and 1000 Hz and between 2500 Hz and 4500 Hz. While the example shows a total frequency range of 0 to 8000 Hz, a range of about 20 Hz to 20,000 Hz may be used to communicate the full range of audible acoustic energy.

To reduce the coupling, a filter can be designed to "pull" the signal in a desired direction. In this example, the filter can be designed to reduce the coupling between the microphone transducer and the speaker transducer in the frequency ranges above the threshold value of 0 dB. In addition, the filter can be configured to have minimal effect on the signal where the coupling is less than the threshold value since any reduction in the input and/or output sensitivity of the microphone transducer and speaker transducer can reduce the capabilities of the communication device.

In the example of FIG. 2, relatively large adjustments to the audio signal, such as a decrease of 10-15 dB at ranges below 300 Hz, may need to be made to reduce coupling below the threshold of 0 dB. However, in the range of 2500 Hz to 4500 Hz, relatively small adjustments of 1 to 3 dB are typically needed. If a static filter is used, changes in the transducers over time can cause the coupling signal to increase, both within the ranges where filtering occurs, and outside of the ranges. For example, a small increase in coupling in the 1800 to 2200 Hz range may result in a coupling value of greater than 0 dB. Increases in the 0 Hz to 1000 Hz range and the 2500 Hz to 4500 Hz range may also occur. The static filter cannot correct these changes. This can result in echoing and distortion becoming worse over time.

To accommodate changes in the coupling values, such as those illustrated in FIG. 2, one or more digital dynamic filters can be used instead of, or in conjunction with, the use of static filters, such as the static filters 105, 109 illustrated in FIG. 1. The dynamically updatable digital filters can be used to adjust the operation of the communication device based on the coupling signal between the speaker transducer 110 and the microphone transducer 102. For example, the dynamic digital filters can include feedback coefficients that can be changed to adjust the filter and maintain the coupling value below the desired threshold across a desired audio frequency range, even when changes occur in the coupling value.

Several different types of dynamic digital filters may be designed to reduce the coupling signal to be below the desired threshold level across the audible frequency band of the communication device. Example filters include impulse response filters such as the finite impulse response (FIR) filter and the infinite impulse response (IIR) filter. The FIR filter is a non-recursive filter, while the IIR filter is a recursive filter. In signal processing, a recursive filter is a type of filter which re-uses one or more of its outputs as an input. This feedback typically results in an unending impulse response, thereby inferring the name of the infinite impulse response filter.

Figure 3A:
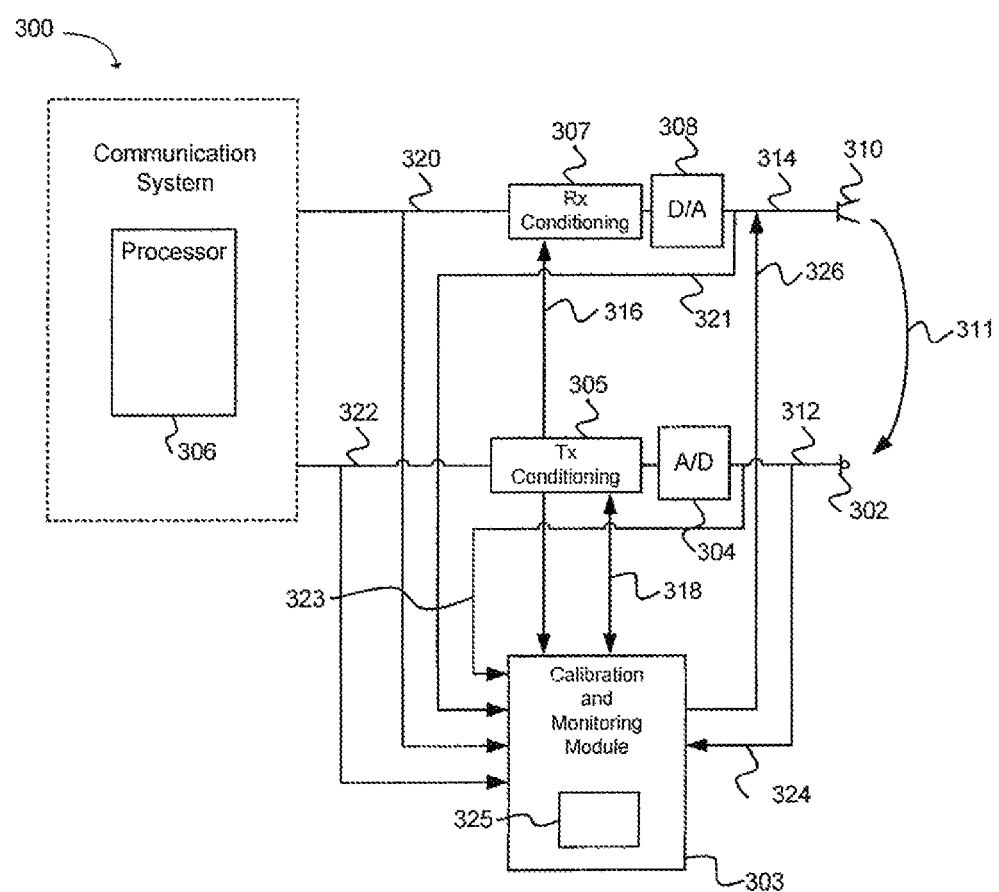
FIG. 3a illustrates a block diagram of an example communication device with dynamic filtering used to characterize transducer components in accordance with an embodiment of the present invention.

FIG. 3a provides an example of a communication device 300 having a calibration and monitoring module 303 that can be used to update dynamic digital filters 305 and 307 based on the coupling signal 311. In this example, a dynamic digital filter 305 is located after the A/D converter 304 for the microphone transducer 302. The dynamic filter can apply a signal conditioning algorithm to the digitized audio signal from the microphone transducer. The signal conditioning algorithm can reduce unwanted peaks in the audio signal that are greater than a selected threshold over a desired bandwidth, as previously discussed.

Similarly, a dynamic filter 307 can be located prior to the D/A converter 308 to provide a signal conditioning algorithm to a digitized speaker transducer signal to adjust portions of the speaker transducer signal that are greater than a selected threshold over a selected bandwidth. The filtered digital speaker transducer signal can then be converted to an analog signal using the D/A 308 and sent to the speaker transducer 310.

While the dynamic filters 305 and 307 are illustrated as being located outside of the processor 306, the application of the signal conditioning algorithms on the signals from the microphone transducer 302 and for the speaker transducer 310 may be implemented using the processor 306, as previously discussed. One or more processors can be used to implement the dynamic filtering. The output of the speaker transducer 310 and the input of the microphone transducer 302 can be dynamically adjusted to reduce a coupling signal 312 to be below a desired threshold.

The actual design of the dynamic filter and the calibration and monitoring module that are operable in one or more processors can be dependent on the type of system it will be implemented in. For example, a telephony handset that includes a microphone and a speaker would have different requirements than a speakerphone with one or more microphones and speakers. A greater level of precision can be achieved by acquiring more sensitive measurements over a desired bandwidth and providing more feedback measurements to processor 306. A greater number of feedback measurements enables the processor to filter at a higher resolution. However, the greater number of feedback measurements can also increase the processing power needed to calculate the signal conditioning parameters on at least one of the microphone transducer or the speaker transducer filters.

The actual design of the dynamic filters can be implemented based on variables including the maximum speaker amplitude, the microphone sensitivity, the number of feedback measurements needed to provide the desired changes in coupling over the audio bandwidth, and the range of the dynamic filters.

The types of feedback provided to the calibration and monitoring module 303, which can operate on processor 306, can be different from the feedback used to implement a static filter. In a static filter, carefully controlled laboratory procedures may be used in controlled environments. For instance, a specially designed acoustic characterization excitation signal, with a known behavior across a selected bandwidth, may be used to characterize an acoustic transducer, such as the microphone transducer or speaker transducer.

The dynamic filtering process can use audio and environmental sounds in the environment in which the communication device will be located to provide feedback to adjust the audio signals. For example, background noise such as traffic, fans, and office chatter may be used as feedback to adjust the dynamic filters to reduce the acoustic coupling between the microphone and speaker transducers. In addition, a knowledge of the acoustic characteristics (i.e. amplitude over a selected bandwidth) of the microphone digitized signals can be used to determine what filtering may be used in the dynamic filter 307 to adjust the speaker transducer digitized signal to reduce coupling between the microphone and speaker.

While the dynamic filters can be used to provide additional filtering at bands where the acoustic coupling increases above a desired threshold, the dynamic filtering process cannot account for any amount of change. In some situations, a significant change in acoustic coupling over a selected bandwidth may be attributable to a damaged or broken part in the communication device. If this occurs, it may be necessary to repair or replace the communication device.

The ability to detect when a device has degraded of failed, while operating in the field, is a significant advantage. When a component degrades past a desired threshold, or fails, it can significantly affect the operation of the communication device. This may reduce a user's overall impression of the company or manufacturer that designs or makes the device. The use of the dynamic filters enables the designer or manufacturer or repair person to more readily identify when poor performance is due to degradation or failure of a specific component. This component can then be repaired or replaced, thereby ensuring that the communication device operates as it was designed, thereby increasing the reliability of the product along with consumer's trust in the brand name of the product. The consumer's trust can provide continued sales and increased demand for a brand name product.

Referring to FIG. 3a, in one example embodiment, during operation of the communication device 300, one or more processors, such as a processor used to operate the calibration and monitoring module 303, can monitor the incoming signal 312 from the microphone transducer 302 and the outgoing signal 314 sent to the speaker transducer 310 to determine echo path characteristics of the coupling signal 311.

For example, signal 321 represents an analog signal sample of signal 314 that is communicated to the calibration and monitoring module 303. Signal 323 represents an analog signal sample of signal 312 that is communicated to the calibration and monitoring module. While both signals 321 and 323 are represented as analog signals, this is not intended to be limiting. Digital samples of the signals 314 and 312 may also be communicated to the calibration and monitoring module. In addition, the calibration and monitoring module itself may include analog to digital and/or digital to analog converters that can be used to sense, monitor, and filter the signals coming from and/or going to the microphone transducer 302 and the speaker transducer 310.

In one example, an adaptive filter using a normalized least mean squares (NLMS) algorithm can be used to calculate the transfer function. Using this transfer function, suitable values for filters 305 and 307 can be calculated and sent to the filters via update paths 316 and 318. The dynamic filters adjust the outgoing signal 314 sent to the speaker transducer and/or the incoming signal 312 input from the microphone transducer, reducing distortion and excessive coupling.

In one embodiment, the calibration and monitoring module can use the signal 320 before the dynamic Rx conditioning filter 307 and the signal 322 after the dynamic Tx conditioning filter 305 in conjunction with all of the other signals described above to determine how well the dynamic filters are performing and whether they need to be updated or re-calibrated.

For example, the signal 320 represents the signal output by the communication system to the speaker transducer 310, prior to dynamic changes that may be made by the dynamic filter 307. The signal 322 represents the signal received by the microphone transducer 302 after the signal has been filtered by the dynamic filter 305. By comparing the signals 320 and 322, a determination can be made whether changes are needed. If the signals are outside of a desired threshold, an update or recalibration may be performed.

In another embodiment, frequency domain averaging of the outgoing signal 314 that is output to the speaker transducer 310 relative to the incoming signal 312 input from the microphone transducer 302 can be used to reduce the amplitude of the coupling signal 311. In one example, a double talk detector module 325 can be configured to operate in the calibration and monitoring module 303. The double talk detector module can be used to provide a calculation of the echo path only during strong single talk. Strong single talk occurs when only the echo signal is present, and no near end talker is speaking at the microphone.

The double talk detector module 325 can be used to detect when only the coupling signal 311 is present. This approach can work well when the ratio between the near end talker signal and the coupling signal is very large, since double talk (coupling signal with near end signal) can be more reliably detected. For example, the ratio can be large when a handset is used for communication. If $X(k)$ is the frequency transform of the loudspeaker output at a time k, and $Y(k)$ is the frequency transform of an input of the microphone transducer, then an approximation of the echo path at time k is:

$$H(k)=Y(k)/X(k).$$

Over time, H_avg is the average of all H(k). H_avg can provide an estimate of the echo path. Based on this echo path, the dynamic filters 305 and 307 can be updated via update paths 316 and 318.

In another example, the communication device 300 can be configured to include a test mode. In this example (referring to FIG. 3a), a test signal 326 can be injected prior to the speaker transducer. The calibration and monitoring module 303 can calculate the echo path and behavior under test conditions using test signal 326 as a reference and recording the incoming signal 324 from the microphone.

Using similar techniques as described in the above examples (such as NLMS adaptive filtering or frequency averaging), the echo path can then be calculated by the calibration and monitoring module. Based on this calculation, the dynamic filters 305 and 307 can be updated via update paths 318 and 316. The filters are then validated by applying a test signal 320 and recoding the signals at 314, 312, and 322. The recordings and other calculated results may also be sent to an outside device, such as a computer, for use in testing or updating the communication device 300.

Figure 3B:
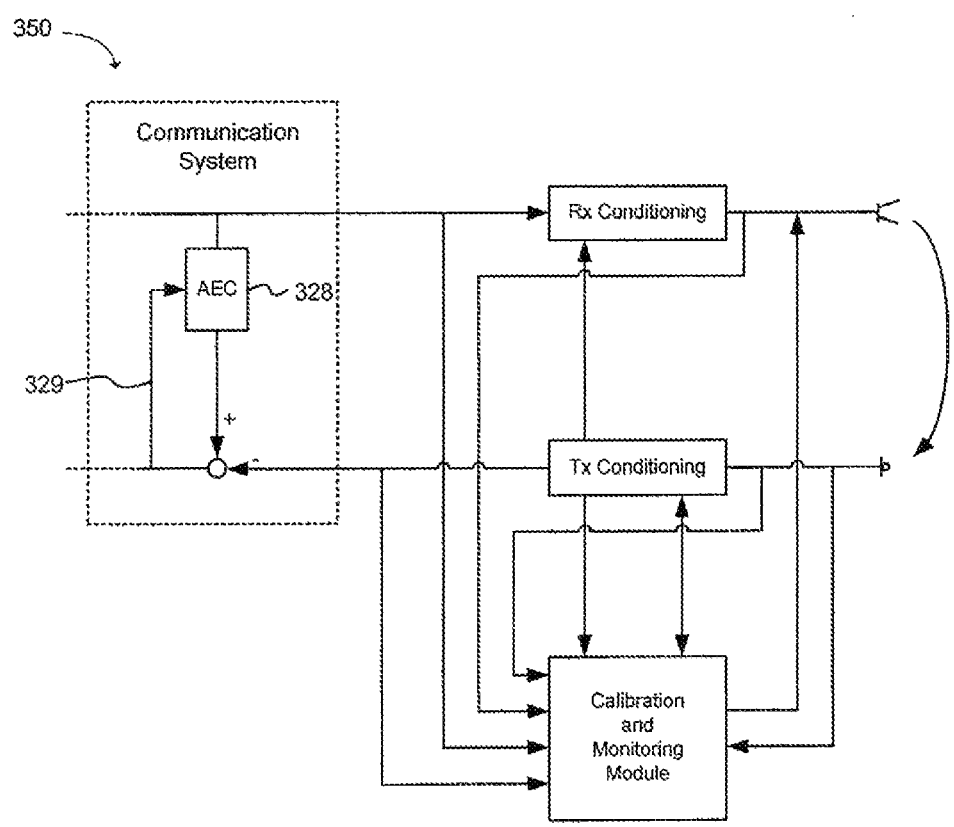
FIG. 3b illustrates a block diagram of an example communication device with dynamic filtering and an acoustic echo canceller in accordance with an embodiment of the present invention.

FIG. 3b provides an additional embodiment in relationship with an Acoustic Echo Canceller 328 of a communications device (350). Signals 320 and 322 are conditioned to operate in such a range so that the AEC can operate effectively using the feedback signal 329. The actual range is dependent on the type of system and component measurements. By using adaptive filters, a broader range of components can be used to construct the communication device.

Figure 3C:
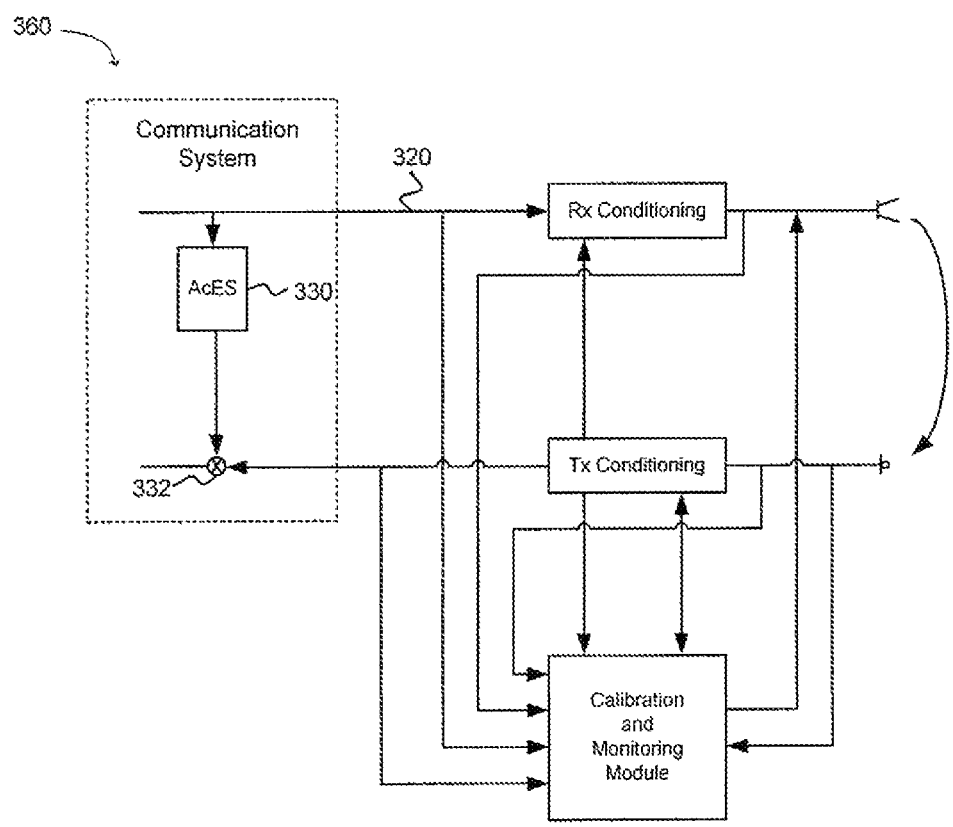
FIG. 3c illustrates a block diagram of an example communication device with dynamic filtering and an acoustic echo suppressor in accordance with an embodiment of the present invention.

FIG. 3c illustrates an embodiment of a communications device 360 configured to operate with an Acoustic Echo Suppressor (AcES) 330. The AcES can be configured to adjust a mask gain 332 of the suppressor based on the outgoing signal 320 and an estimated coupling gain. As previously discussed, the outgoing signal 320 represents the audio signal output by the communication system prior to conditioning by dynamic filter 307.

Another type of filter that can be implemented in processor 306 is the state-space filter. A common state-space filter is the Kalman filter. The Kalman filter, also known as linear quadratic estimation (LQE), is an algorithm that uses a series of measurements observed over time. The measurements can contain noise (random variations) and other inaccuracies. The algorithm can produce estimates of unknown variables that tend to be more precise than those based on a single measurement alone. The Kalman filter operates recursively on streams of noisy input data to produce a statistically optimal estimate of the underlying system state.

In accordance with one embodiment of the present invention, an adaptive digital filter, such as an adaptive FIR filter, an adaptive HR filter, a Kalman filter, or another desired type of dynamically adjustable filter, can be used to dynamically adjust the coupling that occurs between at least one input transducer and at least one output transducer in a communication device. One or more dynamic filters can operate on processor 306 or another processor, as previously discussed.

Figure 4:
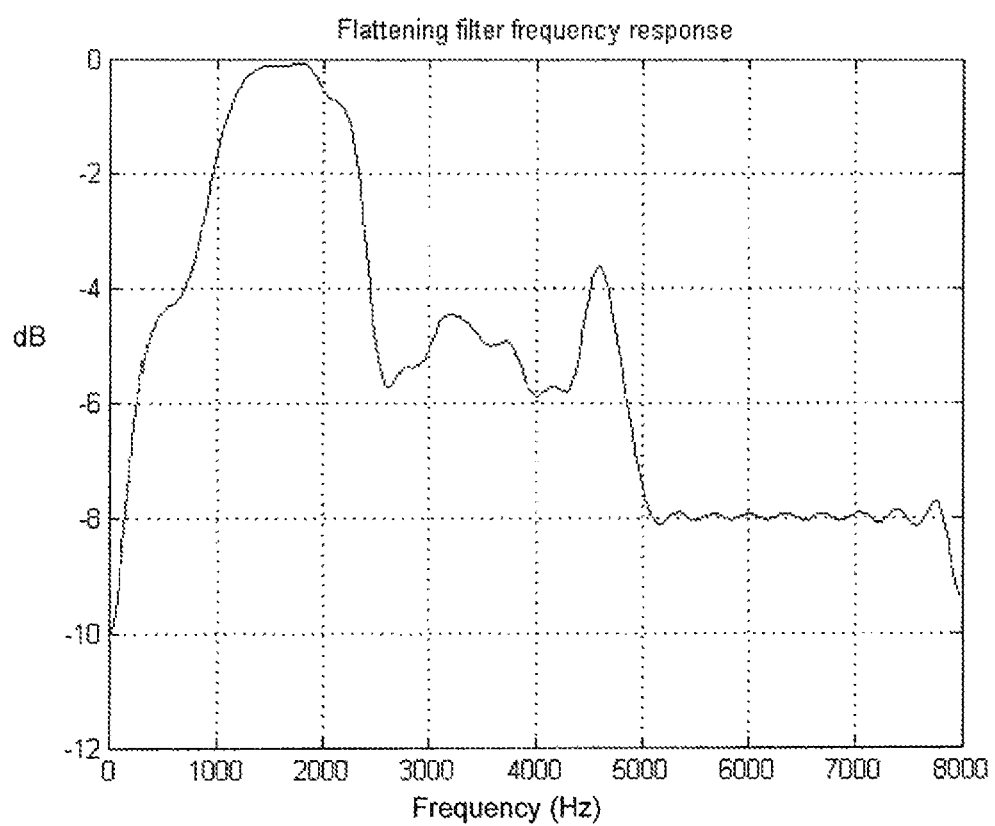
FIG. 4 illustrates a plot of a signal conditioning filter frequency response in accordance with an embodiment of the present invention.

FIG. 4 provides an example of a filtering frequency response curve that was designed to reduce desired portions of the coupling signal illustrated in FIG. 2. In this example, it was desirable to attenuate the coupling signal from 0 Hz to about 1000 Hz and from 2500 Hz to 4500 Hz. For design purposes, the signal in this example is also attenuated from 5000 Hz to 8000 Hz by about 8 dB. The attenuation in the 5000 to 8000 Hz band can be used to enhance the audio's lower frequencies, thereby enabling audio to appear to have greater bass.

With the use of one or more dynamic filters, the shape of the filter illustrated in FIG. 4 can be changed to deal with changes in the coupling signal based on the feedback signals sent to the dynamic filter(s). The processor 306 can use an adaptive filter technique such as the Kalman filter and use inputs from sensor data, such as inputs from the digitized signals from the microphone and speaker, that describe how the coupling signal in the communication device changes. The Kalman filter can average a prediction of the desired signal conditioning filter frequency response curve with a new measurement using a weighted average.

The weights are calculated from the covariance, a measure of the estimated uncertainty of the prediction of the system's state. The result of the weighted average is a new state estimate that lies in between the predicted and measured state, and has a better estimated uncertainty than either alone. This process is repeated every time step, with the new estimate and its covariance informing the prediction used in the following iteration. This means that the Kalman filter works recursively and uses only the last "best guess", rather than the entire history, of the noise in the environment in which the communication device operates in order to calculate an updated signal conditioning filter frequency response used to filter the acoustic coupling that occurs between the speaker and the microphone.

Figure 5:
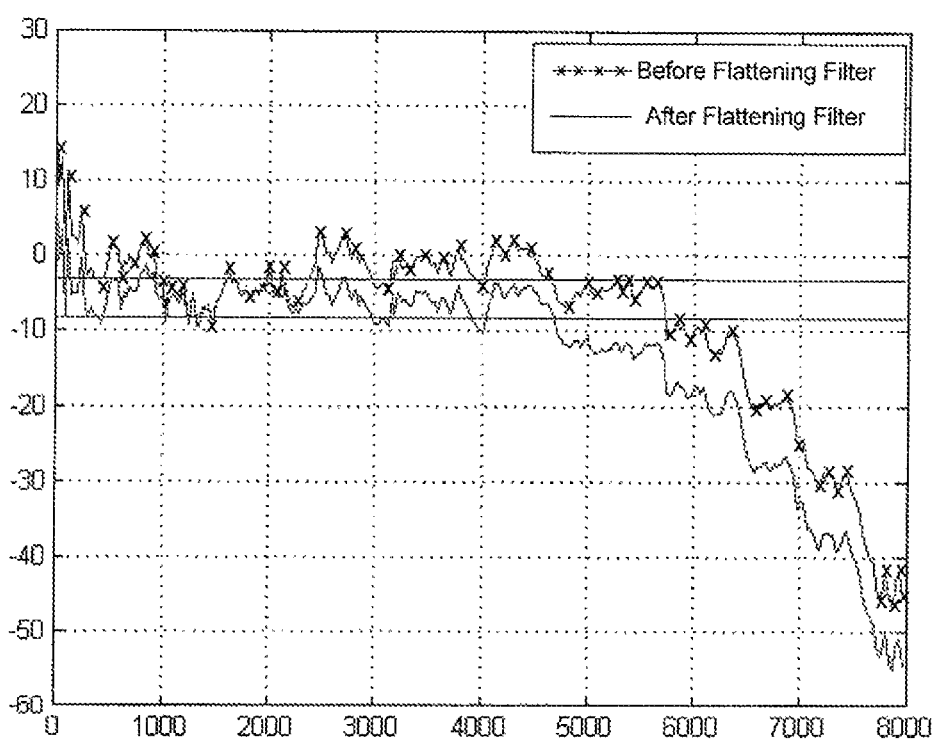
FIG. 5 illustrates plots of the acoustic coupling signal before and after filtering relative to a threshold value in accordance with an embodiment of the present invention.

FIG. 5 illustrates an example of the ERL value (i.e. the coupling signal) both before and after filtering has occurred using a conditioning filter or a signal conditioning filter. As can be seen, the signal conditioning filter successfully reduces the ERL value to be less than 0 dB across the frequency spectrum of the communication device. One or more dynamic filters can be used to maintain this filtering level, even as the communication device component characteristics change and the background and environmental noises in which the communication device operates vary.

Figure 6:
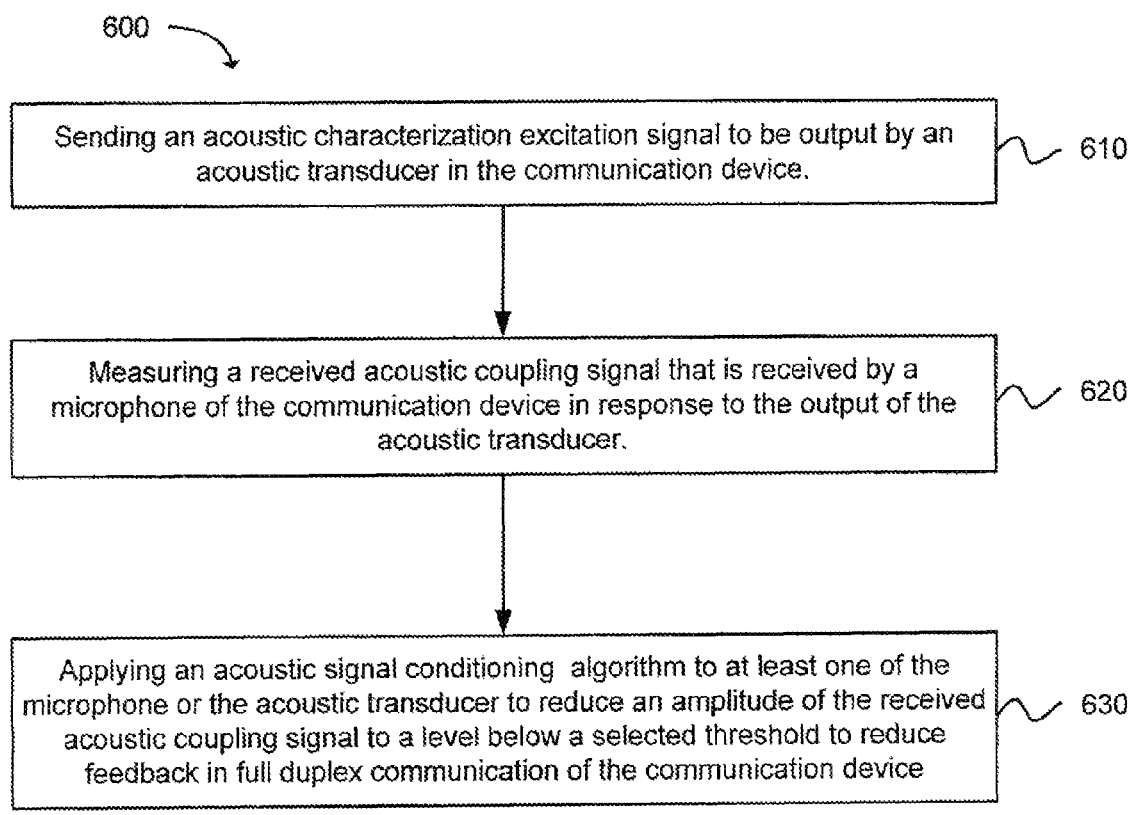
FIG. 6 depicts a flow chart of a method for dynamic characterization of a communication device in accordance with an embodiment of the present invention.

In accordance with one embodiment of the present invention, a method 600 is disclosed for dynamic characterization of a communication device, as depicted in the flow chart of FIG. 6. The method comprises sending an acoustic characterization excitation signal to be output by an acoustic transducer in the communication device, as illustrated in block 610. The acoustic characterization excitation signal can be a prerecorded acoustic signal with predetermined acoustic parameters, such as amplitude over a selected frequency. Alternatively, the acoustic characterization excitation signal can be the output of the acoustic transducer during standard operation of the communication device. For example, the acoustic characterization excitation signal can be the output of a speaker during hands-free communication on a desktop telephone or a specialized speakerphone.

The method 600 further comprises measuring a received acoustic coupling signal that is received by a microphone of the communication device in response to the output of the acoustic transducer, as shown in block 620. An additional operation involves applying an acoustic signal conditioning algorithm to at least one of the microphone or the acoustic transducer to reduce an amplitude of the received acoustic coupling signal to a level below a selected threshold to reduce feedback in full duplex communication of the communication device, as shown in block 630.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for dynamic characterization of a communication device, comprising:
   sending an acoustic characterization excitation signal to be output by an acoustic transducer in the communication device;
   measuring a received acoustic coupling signal that is received by a microphone of the communication device in response to the output of the acoustic transducer;
   applying an acoustic signal conditioning algorithm to at least one of the microphone or the acoustic transducer to reduce an amplitude of the received acoustic coupling signal to a level below a selected threshold to reduce feedback in full duplex communication of the communication device; and
   applying a dynamic signal conditioning algorithm to compensate for changes in at least one of the acoustic transducer or the microphone that occur over time and identifying when a component has failed based on the changes in at least one of the acoustic transducer or the microphone to enable the components to be repaired or replaced.

2. The method of claim 1, further comprising sending the acoustic characterization excitation signal to be output by the acoustic transducer, wherein the acoustic transducer is a hands free speaker for the communication device.

3. The method of claim 1, wherein sending the acoustic characterization excitation signal further comprises receiving a background noise signal to be measured at the microphone.

4. The method of claim 1, wherein sending the acoustic characterization excitation signal further comprises sending at least one of a speech signal or a predetermined acoustic signal to be output by the acoustic transducer and measured by the microphone.

5. The method of claim 1, further comprising applying the acoustic signal conditioning algorithm to provide a desired equalization of amplitude over a selected frequency band for an output of the acoustic transducer to reduce acoustic coupling between the acoustic transducer and the microphone.

6. The method of claim 1, applying the acoustic signal conditioning algorithm to at least one of the microphone or the acoustic transducer.

7. The method of claim 1, wherein applying the signal conditioning algorithm further comprises reducing distortion output by the acoustic transducer.

8. A communication device comprising:
a speaker transducer operable to output an acoustic characterization excitation signal;
a microphone transducer operable to measure a received acoustic coupling signal in response to the output of the speaker transducer;
a processor configured to apply an acoustic signal conditioning algorithm to at least one of the microphone or the acoustic transducer to reduce an amplitude of the received acoustic coupling signal to a level below a selected threshold to reduce feedback in full duplex communication of the communication device; and
applying a dynamic signal conditioning algorithm to compensate for changes in at least one of the acoustic transducer or the microphone that occur over time and identifying when a component has failed based on the changes in at least one of the acoustic transducer or the microphone to enable the components to be repaired or replaced.

9. The communication device of claim 8, wherein the communication device is selected from the group consisting of a desktop phone, a speaker phone, a hands free speaker phone, a smart phone, a tablet computer, a laptop computer, and a desktop computer.

10. The communication device of claim 8, wherein the acoustic signal conditioning algorithm is one of a finite impulse response filter, a state-space filter and an infinite impulse response filter.

11. The communication device of claim 10, wherein feedback is provided to the finite impulse response filter, the state-space filter or the infinite impulse response filter and the feedback includes at least one of background noise or communication using the communication device or a predetermined acoustic signal.

12. The communication device of claim 8, wherein the acoustic signal conditioning algorithm for the microphone transducer is implemented after an analog to digital converter is used to digitize a signal from the microphone transducer.

13. The communication device of claim 8, wherein the acoustic signal conditioning algorithm for the speaker transducer is implemented before a digital to analog converter is used to convert digital signal for the speaker transducer to an analog format.

14. A communication device configured for full duplex communication, having a processor configured to:
send an acoustic characterization excitation signal to be output by a speaker transducer in the communication device;
measure an acoustic coupling signal that is received by a microphone transducer of the communication device in response to the output of the acoustic transducer;
apply an acoustic signal conditioning algorithm to at least one of the microphone transducer or the speaker transducer to reduce an amplitude of the received acoustic coupling signal to a level below a selected threshold and to reduce distortion output by the acoustic transducer; and
applying a dynamic signal conditioning algorithm to compensate for changes in at least one of the acoustic transducer or the microphone that occur over time and identifying when a component has failed based on the changes in at least one of the acoustic transducer or the microphone to enable the components to be repaired or replaced.

15. The communication device of claim 14 that is further configured to apply the acoustic signal conditioning algorithm using an adaptive filter.

16. The communication device of claim 15, wherein the adaptive filter is one of an infinite impulse response filter and a Kalman filter.

17. The communication device of claim 15, wherein the processor is configured to apply the acoustic signal conditioning algorithm using the adaptive filter to adaptively filter a digitized output of the microphone transducer or a digitized speaker signal for the speaker transducer.

* * * * *